Jan. 22, 1963 C. B. RICHEY 3,074,455
TIRE
Filed Oct. 23, 1959 2 Sheets-Sheet 1

C. B. RICHEY
INVENTOR.
BY J. R. FAULKNER
P. F. HILDER

ATTORNEYS

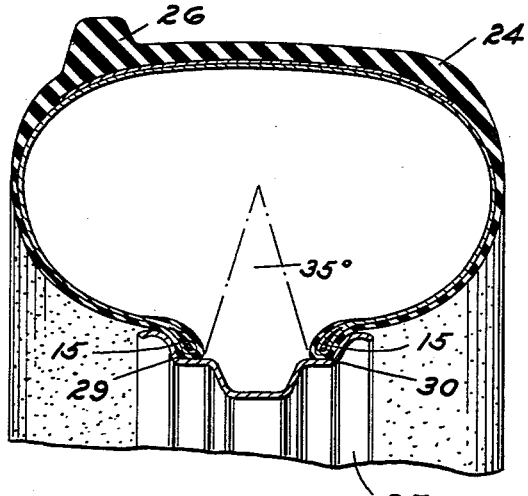
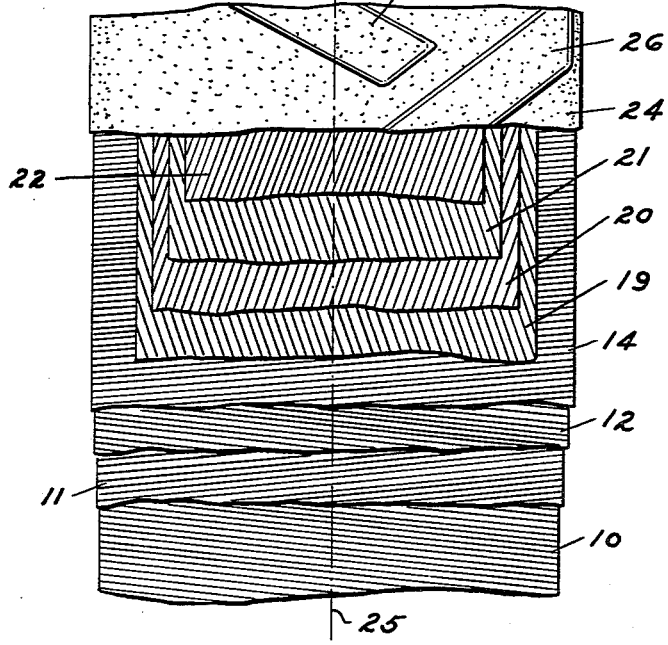

United States Patent Office 3,074,455
Patented Jan. 22, 1963

3,074,455
TIRE
Clarence B. Richey, Royal Oak, Mich., assignor to Ford Motor Company, Dearborn, Mich., a corporation of Delaware
Filed Oct. 23, 1959, Ser. No. 848,306
3 Claims. (Cl. 152—352)

This invention relates to pneumatic tires adapted particularly for off-highway use.

The conventional pneumatic tire in use today employs a relatively wide rim and generally straight sidewalls for economy of manufacture and to provide good stability against side sway. Such tires conventionally are built of bias-cut fabric plies forming the tire sidewalls. The tractive efficiency of such tires in heavy traction off-highway duty is often less than 50 percent.

Studies have been made of forming tires of more or less conventional cross-section with so-called "radial ply" sidewalls in which the sidewall cords extend generally radially from the beads and several tread plies have cords extending generally circumferentially of the tire to form a belt or band of substantially constant length. Such tires under many conditions of highway use have shown increased tractive efficiency.

The tire of the present invention utilizes the so-called "radial ply" construction in combination with a very narrow rim width so that the tire casing cross-section extends in excess of 300 degrees and preferably about 325 degrees. This tire, which is of particular value in relatively slow speed (under 20 m.p.h.), heavy traction off-highway use, provides a narrower, elongated contact area and increased deflection when compared with either a conventional tire formed of bias-cut sidewall cord or a radial ply cord tire of conventional cross-section. Tests have shown this tire to have a greater tractive efficiency and lower fuel consumption than either of these other types.

Among the objects of the present invention are to provide an improved tire adapted for low-speed off-highway use, to provide such a tire having reduced slip and improved tractive efficiency, and generally to improve tires of the type described. Other objects and the nature and scope of the invention will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which I have contemplated applying my invention is illustrated in the accompanying drawings forming part of this specification, in which:

FIGURE 3 is a radial cross-section of the tire mounted on a rim; and

FIGURE 4 is a more or less schematic view indicating the relationship of the cord plies in the body and tread sections of the tire.

Figure 1:
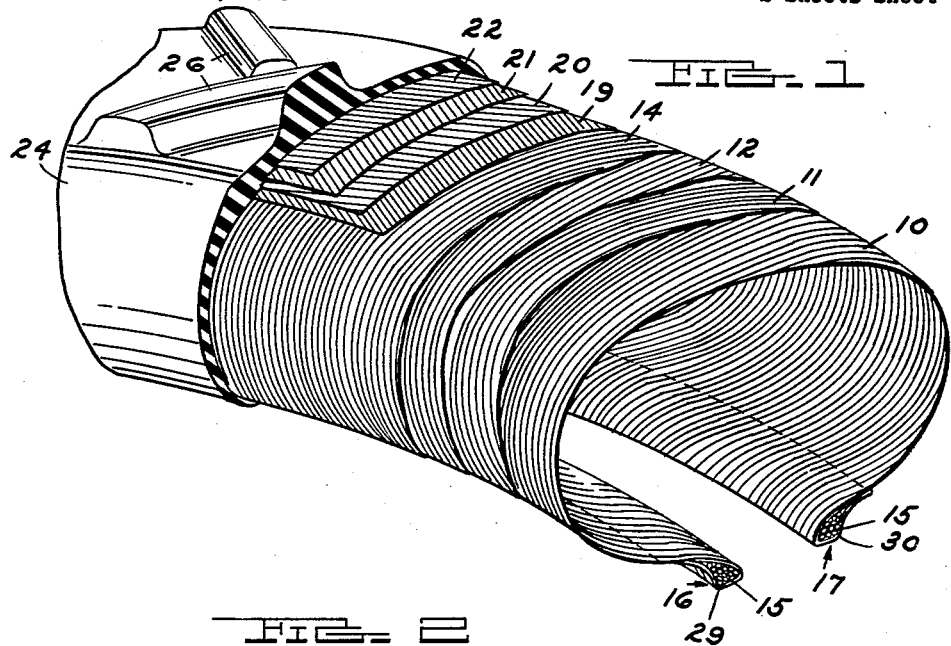
FIGURE 1 is a perspective view of a section of a tire according to the present invention, portions of the tire being broken away or shown in section.
Figure 2:
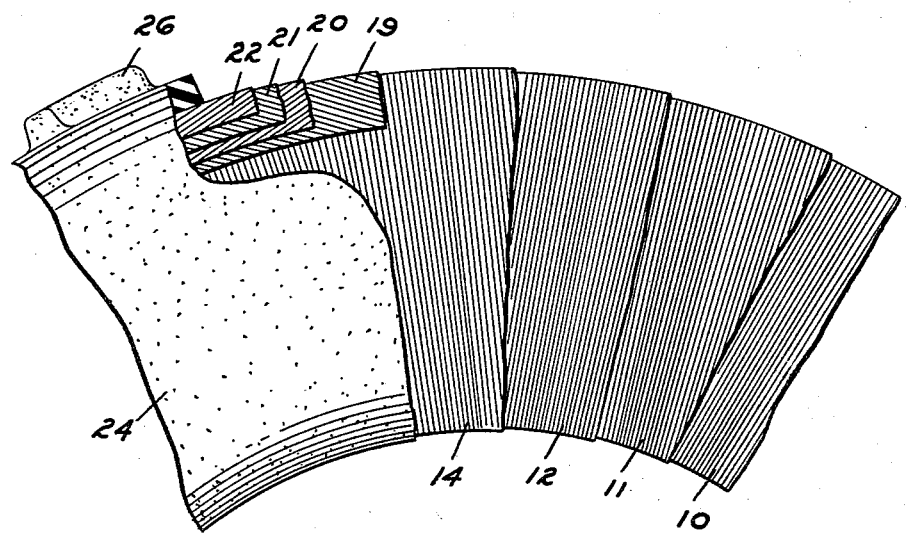
FIGURE 2 is a side elevation of the section shown in FIGURE 1, portions of the tire being broken away or shown in section.

Referring to the drawings, the tire of the present invention is of the "radial ply" construction having a series of plies of rubber impregnated cord extending generally radially from bead to bead of the tire. Preferably, there are four layers or plies of fabric in the sidewall or body of the tire, being indicated as 10, 11, 12 and 14 in the drawings. These plies extend between the customary wire bands 15 located in the beads 16 and 17 of the tire. Each of the plies 10, 11, 12 and 14 are comprised of the usual tire fabric in which the tire cords extend principally in the direction indicated by the lines in the drawings, only enough cross threads being included to reinforce the individual plies during manufacture of the tire. Each of the plies 10, 11, 12 and 14 preferably are laid at an angle of about 5° to the radial, being inclined alternately to the radial so as to make an included angle of about 10° between the cords of adjacent plies. It has been found that the 10° angle of the cords adjacent the plies will reinforce the side wall sufficiently to facilitate bagging of the tire during manufacture without rupturing the sidewall.

The tire of the present invention includes a plurality of, preferably four, tread plies 19, 20, 21 and 22 which extend circumferentially of the tire beneath the thread 24. The tread plies 19, 20, 21 and 22 are formed of the usual rubber impregnated cord tire fabric so cut that the cords form an angle of about 20° with the center line 25 of the tire. These tread plies are laid with the cords inclined alternately to the right and left so as to form an included angle between the cords of adjacent plies of about 40°.

The tread 24 may be of the more or less conventional bar type used on off-highway tractors and formed of a plurality of oppositely inclined rubber cleats or bars 26 molded integrally with the rubber of the tire.

The cross-section of the tire is best shown in FIGURE 3, in which the tire is shown mounted on a rim 27 of drop-center design. The tire differs from usual practice in that the beads 16 and 17 are located about as closely as possible and the rim 27 is about as narrow as possible and still permit mounting the tire on the rim. In the cross-section shown, the body of the tire extends through an arc of in excess of 300° from bead to bead and the distance between the outside corners 29 and 30 of the bead is about 30 percent of the overall width of the tire. Such a construction provides a maximum length of cord between the rim and the thread area of the tire and tends to provide greater deflection of the tire under load.

The combination of the cross-section shown together with radial ply tire construction, including the circumferentially extending tread plies, provides a tire which under load has a longer, narrower footprint or tread contact area with a supporting surface than conventional tires. This is due to the combination of the cross-sectional shape of the tire with the radial ply construction.

Traction tests in the field have indicated that in certain usage, including use on sod, plowed sod, and loose earth, up to 25 percent more work for the same fuel is delivered by the tire construction of the present invention as compared to a conventional tractor tire of the same size and tread section and formed conventionally with bias-cut plies and tested under identical conditions. Tests of tires on standard wide base rims and utilizing the so-called radial ply construction, including tread plies, have shown no substantial improvement in efficiency over conventional tires under these same conditions.

I claim:

1. A tire assembly, including a rim, and a pneumatic tire casing having a pair of beads received by the rim, the casing having a plurality of sidewall cord plies extending between the beads, the individual cords of the plies extending generally radially of the tire, and at least one tread ply having cords extending generally circumferentially of the tire, the casing having a generally oval cross section with the major axis of the oval extending axially of the casing and the distance between the outside corners of the beads being about one-third of the maximum width of the casing.

2. A tire assembly, including a rim, and a pneumatic tire casing having a pair of beads received by the rim, the casing having a plurality of sidewall cord plies extending between the beads, the individual cords of the plies extending generally radially of the tire, and a plurality of tread plies having cords extending generally circumferentially of the tire and making an angle of about 20° with the center line of the tread, the casing having a generally oval cross section with the major axis of the oval extending axially of the casing and the distance between the outside corners of the beads being about one-third of the maximum width of the casing.

3. A tire assembly, including a rim, and a pneumatic tire casing having a pair of beads received by the rim, the casing having a plurality of sidewall cord plies extending between the beads, the individual cords of the plies extending generally radially of the tire with the cords of adjacent plies making a angle of about 10°, and a plurality of tread plies having cords extending generally circumferentially of the tire and making an angle of about 20° with the center line of the tread, the casing having a generally oval cross section with the major axis of the oval extending axially of the casing and the distance between the outside corners of the beads being about one-third of the maximum width of the casing.

References Cited in the file of this patent

UNITED STATES PATENTS

| | | |
|---|---|---|
| 1,846,042 | Taylor | Feb. 23, 1932 |
| 1,921,772 | Paull | Aug. 8, 1933 |
| 1,922,291 | Hargraves | Aug. 15, 1933 |
| 2,268,249 | Goodrich | Dec. 30, 1941 |
| 2,493,614 | Bourdon | Jan. 3, 1950 |
| 2,939,502 | Hindin et al. | June 7, 1960 |

FOREIGN PATENTS

| | | |
|---|---|---|
| 700,435 | Great Britain | Dec. 2, 1953 |